(12) United States Patent  (10) Patent No.: US 8,848,061 B2
Kolarov et al.  (45) Date of Patent: Sep. 30, 2014

(54) IMAGE AND VIDEO QUALITY ASSESSMENT

(75) Inventors: Krasimir D. Kolarov, Menlo Park, CA (US); Steven E. Saunders, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/534,617

(22) Filed: Jun. 27, 2012

(65) Prior Publication Data

US 2014/0002670 A1  Jan. 2, 2014

(51) Int. Cl.
*H04N 17/00* (2006.01)
*H04N 17/02* (2006.01)
*H04N 7/12* (2006.01)
*H04N 11/02* (2006.01)
*H04N 11/04* (2006.01)
*G06K 9/62* (2006.01)

(52) U.S. Cl.
USPC ......... 348/180; 348/193; 348/396.1; 382/228

(58) Field of Classification Search
CPC .................................................. H04N 17/004
See application file for complete search history.

(56) References Cited

U.S. PATENT DOCUMENTS

| 5,228,098 | A |   | 7/1993 | Crinon et al. |
|---|---|---|---|---|
| 5,465,118 | A | * | 11/1995 | Hancock et al. ........... 348/396.1 |
| 6,239,834 | B1 | * | 5/2001 | Miyaji et al. .................. 348/193 |
| 2003/0031368 | A1 | * | 2/2003 | Myler et al. .................. 382/228 |
| 2009/0147853 | A1 | * | 6/2009 | Dane et al. ............... 375/240.16 |
| 2011/0169964 | A1 | * | 7/2011 | Konoshima .................... 348/180 |
| 2012/0307076 | A1 | * | 12/2012 | Hall et al. ..................... 348/180 |

* cited by examiner

*Primary Examiner* — Jefferey Harold
*Assistant Examiner* — Sean Haiem
(74) *Attorney, Agent, or Firm* — Kenyon & Kenyon LLP (57) ABSTRACT

Evaluating coded video by identifying spatial and temporal errors in the reconstructed video. Spatial errors may be identified by evaluating the severity of each individual error and pooling closely located errors to determine whether the collection of errors is noticeable. Temporal errors may be identified by evaluating the quality of each frame and then pooling consecutive frames to determine whether the collection of frames has errors that may be noticeable if the errors persist within the sequence of consecutive frames. The quality of the frames may be analyzed with any conventional analysis metric. In an embodiment, the quality of the frames may be analyzed using a row-column metric. The calculated analysis metrics may be normalized to accurately compare different metric calculations.

37 Claims, 8 Drawing Sheets

IMAGE AND VIDEO QUALITY ASSESSMENT

BACKGROUND

Aspects of the present invention relate generally to the field of video processing, and more specifically to analyzing coded video data.

In conventional video coding systems, an encoder may code a source video sequence into a coded representation that has a smaller bit rate than does the source video and thereby achieve data compression. A video encoder may select from a variety of coding modes to code video data, and each different coding mode may yield a different level of compression, depending upon the content of the source video, the coding mode selected, and the capabilities of the encoder. Then a video decoder may invert the operations performed by the encoder to generate recovered video data. The encoding and decoding process often introduces errors in the video that may be visible as artifacts or other noticeable differences.

Often, video is encoded into a plurality of different versions. For example, the video may be encoded with a high resolution and a low resolution, may be encoded with or without subtitles or with subtitles in different languages, or may be encoded for compatibility with different decoding devices. Then each version must separately undergo a quality check. Conventionally, the quality check for each version of coded video is executed via a manual review of each version to identify noticeable quality errors in the encoding. Such manual review may include physically viewing the playback of the video. This may be an extremely time consuming and error prone process. Furthermore, conventional methods of error detection do not adequately detect temporal artifacts.

Accordingly, there is a need in the art to efficiently identify noticeable errors in coded video and effectively analyze the coded video sequence.

BRIEF DESCRIPTION OF THE DRAWINGS

The foregoing and other aspects of various embodiments of the present invention will be apparent through examination of the following detailed description thereof in conjunction with the accompanying drawing figures in which similar reference numbers are used to indicate functionally similar elements.

DETAILED DESCRIPTION

A video quality analysis tool may be implemented to support automated video process quality checking, including, for example, checking the results of converting master video movie titles into various specific target formats for sale or other distribution. The quality analysis tool may provide a pass/fail decision for the video, an identification of the worst errors in the video, and/or frame by frame identification of the calculated quality measures. Such identification may additionally provide a short list of problem areas that requires further review to determine whether the video passes the quality check.

An embodiment of the present invention may be utilized to evaluate coded video by identifying spatial and temporal errors in the reconstructed video. According to an embodiment, spatial errors may be identified by evaluating the severity of each individual error. If any one error is detrimental to the quality of the video, for example by creating a noticeable artifact in the image, the frame having the error is identified as having failed the analysis. However, some individual errors standing alone may not be considered noticeable, but several small but closely located errors may be more significant. Accordingly, the identified errors may be pooled for predefined regions, a pixel block or row for example, and then the region may be evaluated to determine whether the collection of errors in the region is noticeable. If the collection of errors in a region is detrimental to the quality of the video the frame having the region is identified as having failed the analysis.

Similarly, an embodiment of the present invention may be utilized to evaluate coded video by identifying spatial and temporal errors in the reconstructed video. According to an embodiment, temporal errors may be identified by evaluating the quality of each individual frame as previously noted. However, errors in a single frame may not be considered noticeable, but several small errors that persist throughout a sequence of frames may be more significant. Accordingly, each sequence of consecutive frames may be evaluated to determine whether the errors throughout the sequence are noticeable. If the sequence errors are detrimental to the quality of the video, the entire sequence is identified as having failed the analysis.

The quality of the frames may be analyzed with any conventional analysis metric. A new row-column metric is described that considers the average values of the pixels in a row, or in a column. The row-column metric may be valuable for identifying bad rows, frame edges, or streaks among other fault patterns.

The calculated analysis metric for a frame may be normalized to compare different metrics. If different metrics are used for different frames, the frames may be compared using the normalized metrics. Then the quality analysis tool may identify the worst portions of the video or generally rate the quality of the video.

Figure 1:
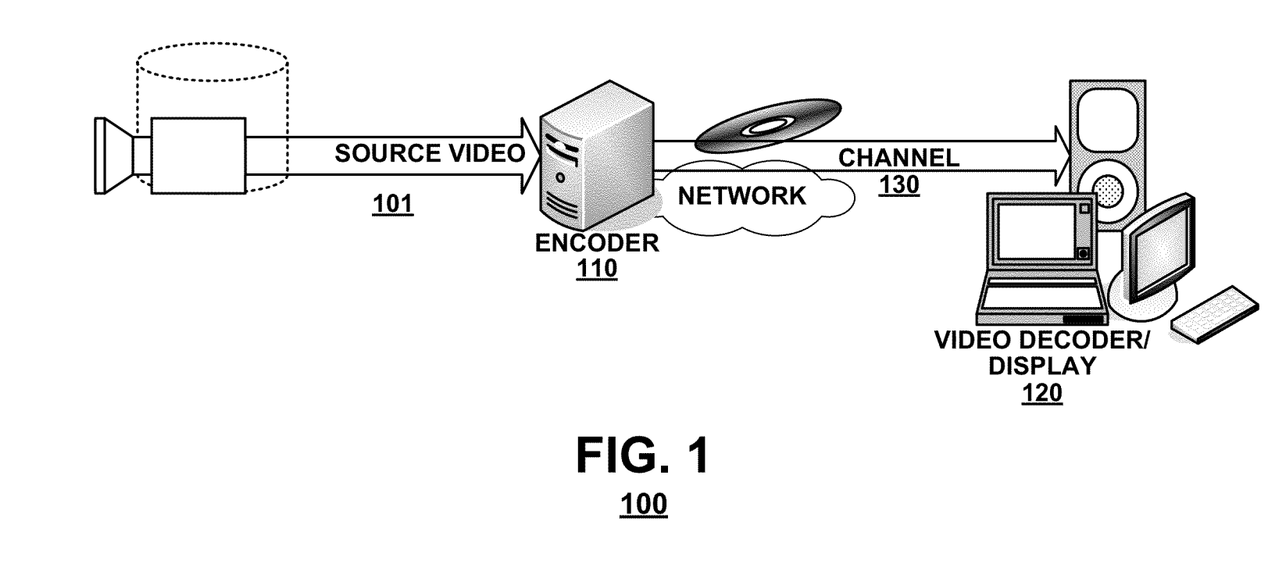
FIG. 1 is a simplified block diagram illustrating components of an exemplary video coding system according to an embodiment of the present invention.

FIG. 1 is a simplified block diagram illustrating components of an exemplary video coding system 100 according to an embodiment of the present invention. As shown in FIG. 1, an exemplary video coding system 100 may include an encoder system 110 and a decoder system 120 provided in communication via a channel 130. The encoder system 110 may accept a source video 101 and may code the source video 101 as coded video data, which typically has a much lower bit rate than the source video 101. The encoder system 110 may output the coded video data to the channel 130, which may be a storage device, such as an optical, magnetic or electrical storage device, or a communication channel formed by a computer network or a communication network. According to an aspect of an embodiment, the encoder may additionally output the source video 101 to the channel 130. The decoder system 120 may receive the coded video data from the channel 130, invert the coding operations performed by the encoder system 110 and output decoded video data to an associated display device. The decoded video data is an approximate reconstruction of the source video 101 that may include visually perceptible artifacts. An analysis tool may be implemented within the coding system 100 to analyze the quality of the reconstructed video data with reference to the original source video data to identify perceptible artifacts or other noticeable errors in the reconstruction.

Figure 2:
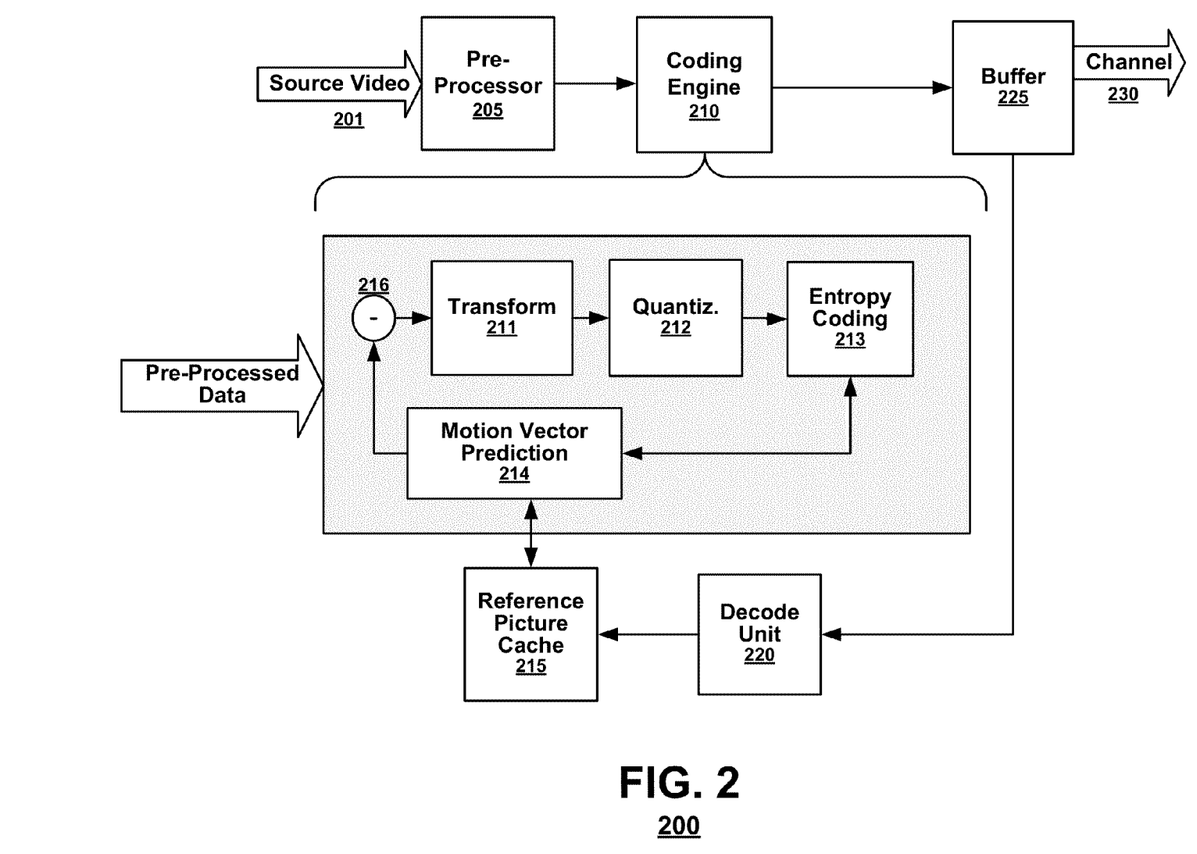
FIG. 2 is a simplified block diagram illustrating components of an exemplary encoder according to an embodiment of the present invention.

FIG. 2 is a simplified block diagram illustrating components of an exemplary encoder 200 according to an embodiment of the present invention. As shown in FIG. 2, the encoder 200 may include a pre-processor 205, a coding engine 210, a reference picture cache 215, a decode unit 220, and a coded video data buffer 225. The encoder 200 may receive an input source video sequence 201 from a video source such as a camera or storage device. The pre-processor 205 may process the input source video sequence 201 as a series of frames and condition the source video for more efficient compression. For example, the image content of an input source video sequence may be evaluated to determine an appropriate coding mode for each frame. The pre-processor 205 may additionally perform video processing operations on the frames including filtering operations such as de-noising filtering, bilateral filtering or other kinds of processing operations that improve efficiency of coding operations performed by the encoder 200.

The coding engine 210 may receive the processed video data from the pre-processor 205 and generate compressed video. Reference frames used to predictively code the video data may be decoded and stored in reference picture cache 215 for future use by the coding engine 210. The coded frames or pixel blocks may then be output from the coding engine 210 and stored in the buffer 225 for transmission on the channel 230.

Similarly, a decoder (not shown) may invert the operations performed by the encoder 200 to generate recovered or reconstructed video data. For example, a decoder may include a decoding engine, a reference picture cache and a post-processor. The decoder may receive the compressed video data from the channel and prepare the video for display by inverting coding operations performed by the encoder 200 using a decoding engine, a reference picture cache, and a post-processor. The decoder may prepare decompressed video data for display by filtering, de-interlacing, scaling or performing other processing operations on the decompressed sequence that may improve the quality of the video displayed with a post-processor. The processed video data may be displayed on a screen or other display or may be stored in a storage device for later use.

FIG. 2 further illustrates a simplified exemplary coding engine 210 according to an embodiment of the present invention. The coding engine 210 may receive the processed video data from the pre-processor 205 and generate compressed video to achieve bandwidth compression. The coding engine 210 may operate according to a predetermined protocol, such as H.263, H.264, or MPEG-2. The coded video data output from the coding engine may therefore conform to a syntax specified by the protocol being used. The coding engine 210 may include an encoding pipeline further including a transform unit 211, a quantizer unit 212, an entropy coder 213, a motion vector prediction unit 214, and a subtractor 216. The transform unit 211 may convert the processed data into an array of transform coefficients, for example, by a discrete cosine transform (DCT) process or wavelet process. The transform coefficients can then be sent to the quantizer unit 212 where they may be divided by a quantization parameter.

The quantized data may then be sent to the entropy coder 213 where it may be coded by run-value or run-length or similar coding for compression.

The coding engine 210 may further access a decode unit 220 that decodes the coded video data output from the encoding pipeline by reversing the entropy coding, the quantization, and the transforms. Decoded frames may then be stored in a picture cache 215 for use by the coding engine 210. The reference picture cache 215 may store frame data that represents source blocks for the skip mode and sources of prediction for later-received frames input to the encoder 200. The subtractor 216 may compare the incoming video data to the predicted video data output from motion vector prediction unit 214, thereby generating data representative of the difference between the two data. However, non-predictively coded data may be coded without comparison to the reference pictures. The coded video data may then be output from the coding engine 210 and stored by the coded video data buffer 225 where it may be combined into a common bit stream to be delivered by the transmission channel to a decoder, terminal, or data storage. A quality analysis tool may then be implemented to analyze the coded video data as compared to the source video data 201.

Figure 3:
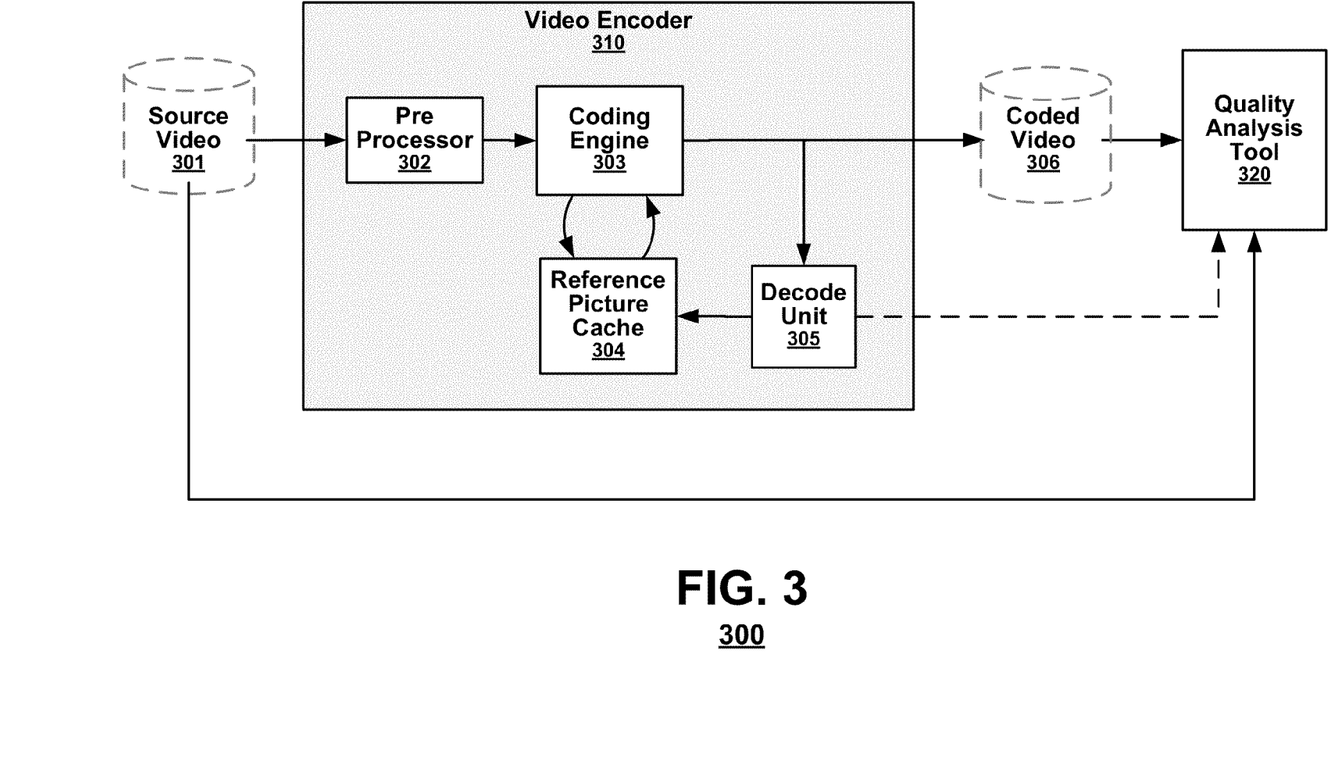
FIG. 3 is a simplified block diagram illustrating components of an exemplary coding system for analyzing the quality of coded video data according to an embodiment of the present invention.

FIG. 3 is a simplified block diagram illustrating an exemplary coding system 300 for analyzing the quality of coded video data according to an embodiment of the present invention. As shown, the coding system 300 may include a video encoder 310 and a quality analysis tool 320 that may be implemented to analyze the quality of the video data 306 coded by the video encoder 310. As previously described, the encoder may include a preprocessor 302, a coding engine 303, a picture reference cache 304 and a decode unit 305 to process and encode the input source video 301.

According to an aspect of an embodiment, the quality analysis tool 320 may decode the coded video data 306 as described above with respect to decoder. Then the quality analysis tool 320 may evaluate the decoded video data in part by comparing the reconstructed video data to the source video data 301. According to an alternate aspect of an exemplary embodiment, the quality analysis tool 320 may receive the reconstructed frames from the decode unit 305 of the encoder 310 and then use the received reconstructed frames to evaluate the video data.

Each frame of the video data may be analyzed to identify errors and other low-quality regions of the frame. A comparison of the reconstructed frame to the source frame may identify pixel-level errors induced during the encoding process. The pixels that have identified errors may then be analyzed to determine if the quality of coded frame meets a pre-determined minimum quality threshold. For example, a few spatially dispersed pixel errors may not be noticeable and accordingly have limited effect on the overall quality of the frame, whereas a group of closely located pixel errors may cause visible artifacts.

The single frame errors may be identified and analyzed using one or more quality metrics, for example pixel difference, squared pixel difference, absolute pixel difference, block-wise pixel covariance, local pixel covariance, etc. Then the identified errors may be pooled to identify regions of the frame that may have poor quality. Thus, analysis of the frame may include both a single pixel minimum quality threshold and a regional minimum quality threshold. For example, the regional minimum quality threshold may be calculated as the average quality for a pixel block or macroblock.

Each metric used to evaluate the quality of the image may be associated with both a single error quality threshold and a collective error quality threshold. The threshold for each metric may be determined according to size, frame rate, transformations applied, target decoder, or other factors. Alternatively, quality thresholds may be adjusted according to the level of quality that may be desired as passing or failing the analysis.

Figure 4:
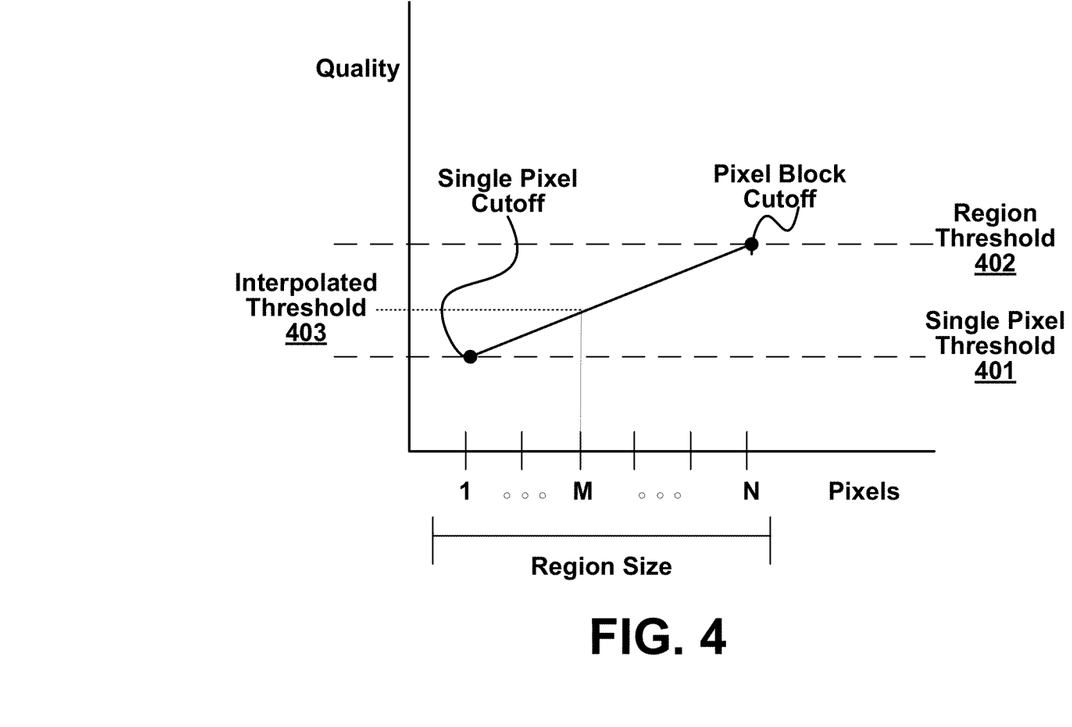
FIG. 4 illustrates exemplary regional quality thresholds according to an embodiment of the present invention.

FIG. 4 illustrates exemplary regional quality thresholds according to an embodiment of the present invention. As shown in FIG. 4, because a single error may be less noticeable than a collection of closely located errors, a single pixel may have a lower quality threshold than a collection of pixels. Thus the single pixel threshold 401 may be set at a lower quality rating than the region threshold 402.

Additionally, as shown in FIG. 4, a threshold 403 for a sub-block may be interpolated between the single error threshold 401 and the regional error threshold 402. Then if any sub-block falls below the interpolated threshold, the sub-block may be determined to fail the quality analysis. For example, if a sub-block consisting of fewer pixels (M) than a pixel block (having N pixels) has an averaged quality metric that falls below the interpolated quality threshold 403, the sub-block may be determined to fail the quality analysis. Sub-block thresholds may be interpolated linearly, logarithmically, or by any other appropriate function.

As described, the quality analysis tool may identify individual frames having poor quality or noticeable errors. The quality may be determined in part as difference between the reconstructed frame and the source frame. One or more quality analysis metrics may be utilized to evaluate the quality of the reconstructed frame. If the determined quality rating for any one metric is below a minimum quality threshold associated with that metric, the frame may be considered as having failed the quality analysis. According to an aspect of an exemplary embodiment, if a frame passes the quality analysis for a single metric, but the aggregate of the available quality metrics falls below a predetermined aggregate metric threshold, the frame may be deemed to have failed the quality analysis.

Figure 5:
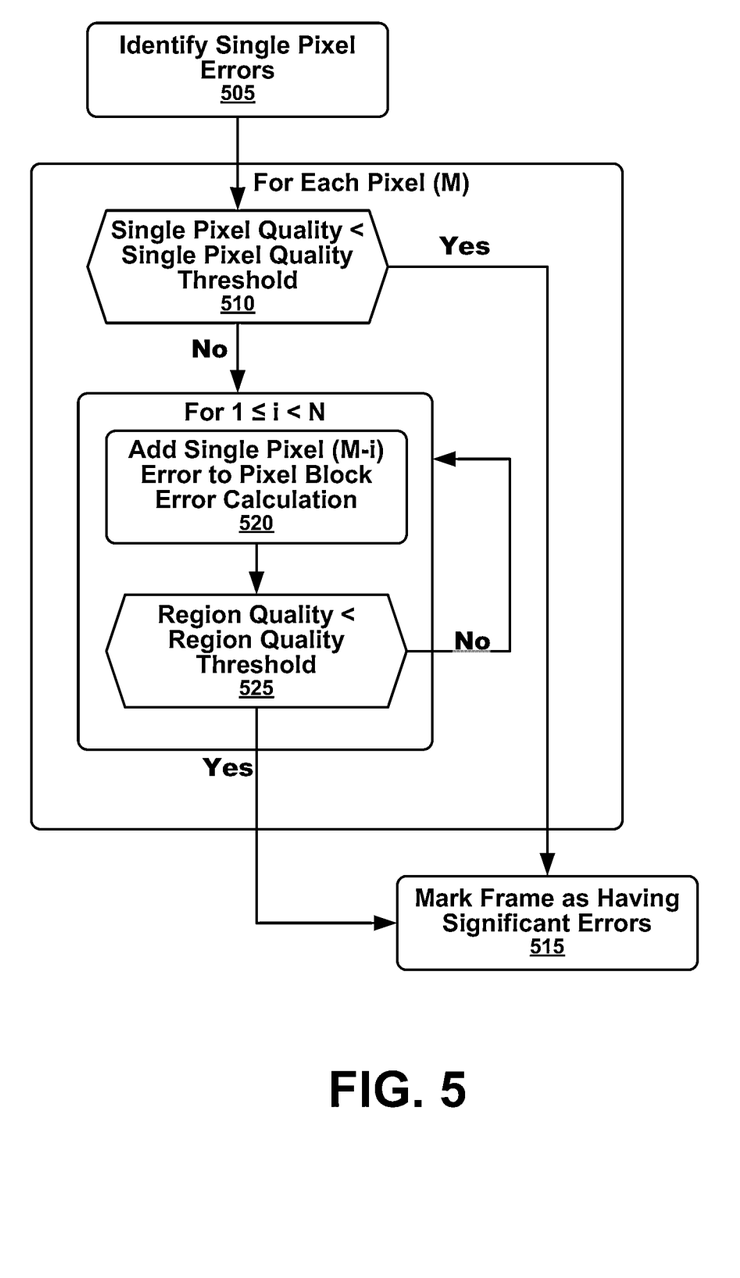
FIG. 5 is a simplified flow diagram illustrating an exemplary method for identifying errors in a single frame according to an embodiment of the present invention.

FIG. 5 is a simplified flow diagram illustrating a method for identifying errors in a single frame according to an embodiment of the present invention. A quality analysis tool may analyze the quality or error level for each pixel in the frame (block 505). For each pixel, the quality analysis tool may determine whether the single pixel error is significant, for example, by determining whether the single error causes the quality rating of the frame to fall below a predetermined single error threshold (block 510). If the single error has a quality rating that falls below the predetermined single error threshold, the quality analysis tool may mark the frame as having significant errors (block 515). A marked frame may be further analyzed by the quality analysis tool or highlighted for manual review to determine whether the frame causes noticeable errors during video playback. According to an aspect of an embodiment, a frame may be marked as failing the quality analysis multiple times.

If the single error has a quality rating that does not fall below the predetermined single error threshold, the quality analysis tool may evaluate the quality of a block of pixels (block 520). For example, the frame may be divided into regions for analysis, for example pixel blocks or macroblocks. The pixel blocks may include a maximum number of pixels (N) and have an associated pixel block quality threshold.

Furthermore, the quality analysis tool may determine a quality rating for some sub-regions of pixels within the pixel block region. Then the quality analysis tool may evaluate sub-regions of pixels starting with the current single pixel error. The quality analysis tool may initially evaluate the quality of a sub-region consisting of the current pixel (M) and a previously evaluated pixel (M−1) (block 520). If the quality of the sub-region consisting of pixel M and pixel M−1 is less than the sub-region threshold for a sub-region of that size (block 525), the quality analysis tool may mark the frame as having significant errors (block 515). If the sub-region does not have a quality less than the sub-region threshold for a sub-region of that size (block 525), the quality analysis tool may then evaluate the quality of the sub-region with the next pixel (M−2), and the next (M−3), and so on until the sub-region is the size of a pixel block consisting of N pixels or until there are no further pixels to be added to the sub-region. The sub-region thresholds may be determined by interpolating from the single error threshold and the pixel block quality threshold.

In some instances, errors in individual frames may not be noticeable to an individual viewing the video playback for a sequence of frames. However, errors that individually may not be noticeable but that persist over multiple frames may be noticeable due to the persistence of the error. Accordingly, the quality analysis tool may additionally monitor and analyze errors across a sequence of frames to identify temporal errors.

Figure 6A:
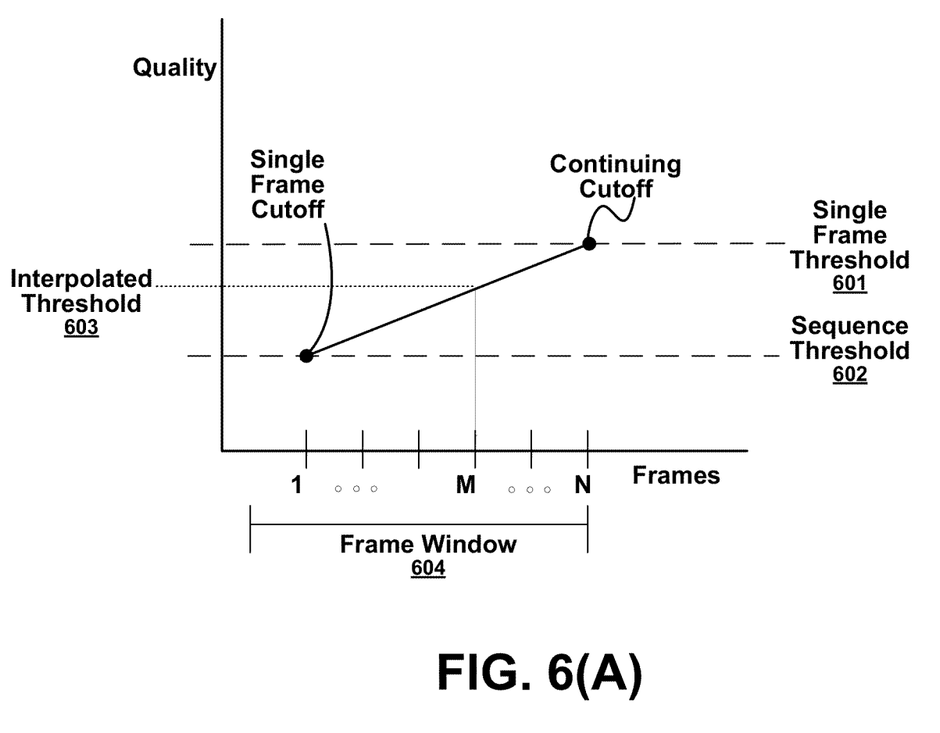
FIGS. 6(A)-(B) illustrates exemplary temporal quality thresholds according to an embodiment of the present invention.

FIG. 6(a) illustrates exemplary temporal quality thresholds according to an embodiment of the present invention. As shown in FIG. 6(a), because errors on a single frame may be less noticeable than a collection of errors across a sequence of frames, a single frame may have a lower quality threshold than a sequence of frames. Thus the single frame threshold 601 may be set at a lower quality rating than the region threshold 602.

As previously noted, the quality of a frame may be determined according to any of a plurality of quality analysis metrics, including, for example, structural similarity (SSIM), visual quality model (VQM), mean-squared error (MSE), just noticeable difference (JND), peak signal-to-noise ratio (PSNR), row-column analysis as described herein, or the evaluation of total errors in a region and sub-region as described herein. Additionally, multiple quality metrics may be calculated and each metric compared to a metric specific threshold so that if the quality of a frame is below the threshold for any metric, the frame is determined to have failed the quality analysis. Similarly, the errors across multiple frames may be pooled, thus a sequence of frames may be evaluated for each quality metric.

Each metric may be associated with both a single frame minimum quality threshold and a sequence minimum quality threshold. For example, if a sequence size is N frames, if the sequence quality metric for any N consecutive frames in the video falls below the predetermined threshold, that sequence may be determined to fail the quality analysis.

The quality analysis tool may evaluate each sequence as a moving window 604, such that any N consecutive frames may be evaluated by the quality analysis tool. For example, a sequence may consist of six frames, or approximately 0.25 seconds in a 24 fps video. Then once the six frames have been analyzed, the oldest frame may be dropped from the sequence and a new frame added. Thus the sequence for analysis forms a moving frame window 604 of N frames.

Additionally, as shown in FIG. 6, a threshold for a sub-sequence may be interpolated between the single frame threshold and the sequence threshold. Then if any sub-sequence falls below the interpolated threshold 603, the sub-sequence may be determined to fail the quality analysis. For example, if a sub-sequence consisting of M frames has a sequence quality metric that falls below the interpolated quality threshold 603, the sub-sequence may be deemed to have failed the quality analysis. The sub-sequence thresholds may be interpolated linearly, logarithmically, or by any other appropriate function.

Figure 6B:
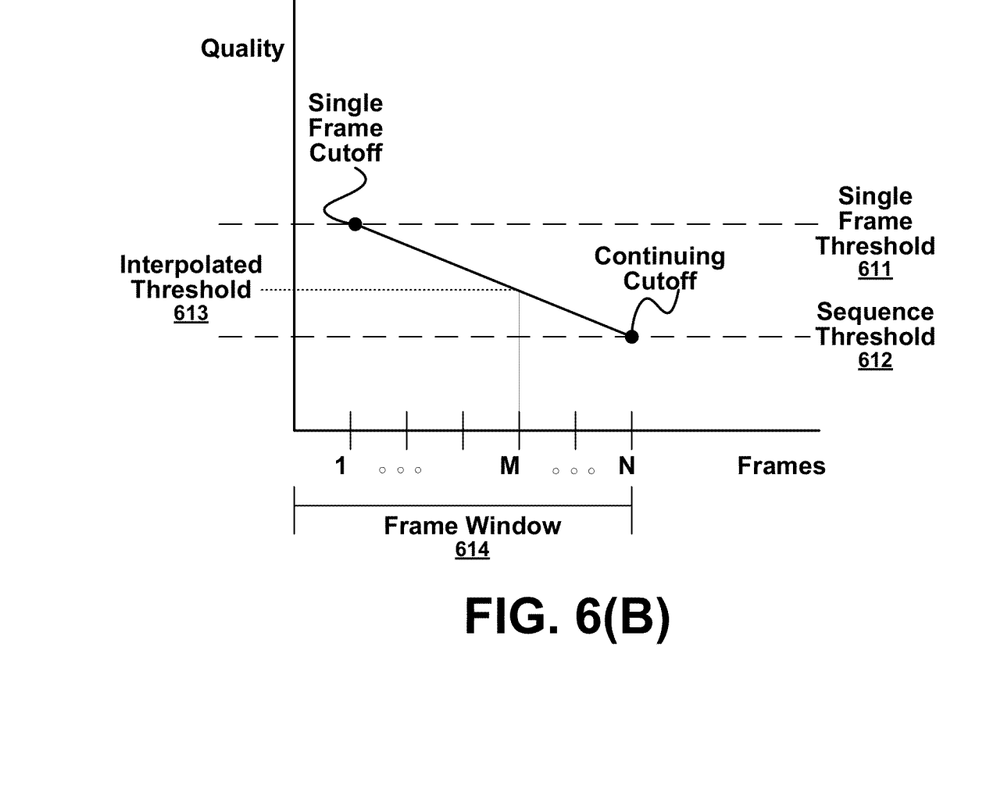

FIG. 6(b) illustrates exemplary temporal quality thresholds according to an embodiment of the present invention. As shown in FIG. 6(b), a single frame error may have a higher quality threshold than a sequence of frames. For example, a number of errors, and therefore a lower quality rating, may be more visible on a single frame than that same number of errors across a sequence of frames. Thus the sequence quality threshold 601 may be set at a lower quality rating than the single frame quality threshold 602.

Figure 7:
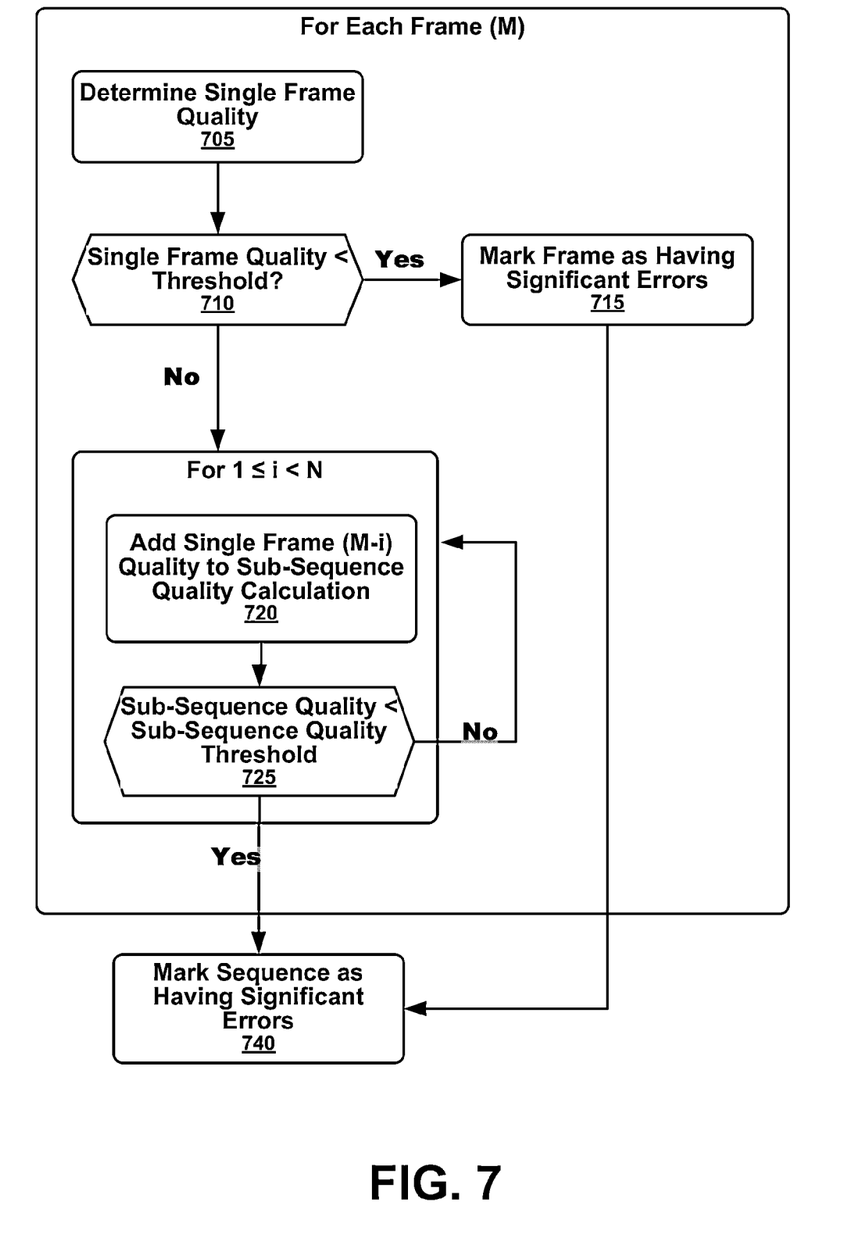
FIG. 7 is a simplified flow diagram illustrating an exemplary method for identifying errors in a sequence according to an embodiment of the present invention.

FIG. 7 is a simplified flow diagram illustrating a method for identifying errors in a sequence according to an embodiment of the present invention. For each frame, a quality analysis tool may determine a quality rating for the frame using a known quality metric (block 705). The quality analysis tool may then determine whether the single frame quality rating is sufficient, for example, by determining whether the quality rating is below a predetermined single frame threshold (block 710). If the single frame has a quality rating that falls below the predetermined single error threshold, the quality analysis tool may mark the frame as having significant errors (block 715). A marked frame may be further analyzed by the quality analysis tool or highlighted for manual review to determine whether the frame causes noticeable errors during video playback. If a frame is marked, the quality analysis tool may mark the sub-sequence as having significant errors (block 740). According to an aspect of an embodiment, a frame or sequence may be marked as failing the quality analysis multiple times.

Furthermore, the quality analysis tool may determine a quality rating for some sub-sequences of frames within the sequence. The quality analysis tool may initially evaluate the quality of a sub-sequence consisting of the current frame (M) and a previously evaluated frame (M−1) (block 720). For example, by evaluating the total errors for the sequence or averaging the quality ratings for the individual frames in the sequence. If the quality of the sub-sequence consisting of frame M and frame M−1 is less than the sub-sequence threshold for a sub-sequence of that size (block 725), the quality analysis tool may mark the sub-sequence as having significant errors (block 740). A marked sequence may be further analyzed by the quality analysis tool or highlighted for manual review to determine whether the sequence has noticeable errors during video playback.

If the sub-sequence does not have a quality less than the sub-sequence threshold for a sub-sequence of that size (block 725), the quality analysis tool may then evaluate the quality of the sub-sequence with the next frame (M−2), and the next (M−3), and so on until the sub-sequence is the size of a standard sequence or until there are no further frames to be added to the sub-sequence. The sub-sequence thresholds may be determined by interpolating from the single frame threshold and the sequence quality threshold.

The quality analysis tool may identify all of the frames that failed the quality analysis, may identify the worst offenders, may rank the identified frames by most to least errors, may provide an interface for viewing sequences of frame that failed the quality analysis and manually evaluating the visual quality of the sequence by determining if the identified errors are noticeable, or may otherwise provide the results of the quality analysis to a user.

In accordance with an aspect of an exemplary embodiment, if a quality rating is determined by averaging a plurality of metrics or quality ratings, the metrics and quality ratings may be given a predetermined limit. For example, if a first frame is an exact match to a second frame, the quality analysis may result in a zero rating (for MSE) or an infinite score (for PSNR). Using such a rating in an average calculation may mask the errors in subsequent frames in the sequence. Then, setting the predetermined limit for each metric, for example at the just-perceptible or noticeable impairment level (JND), may improve quality calculations over a sequence.

In accordance with an aspect of an exemplary embodiment, multiple or different metrics may be used to identify frames or sequences having significant errors. For example, quality may be measured by MSE for one frame and SSIM for another frame. Accordingly, to compare the frames identified using different quality metrics, the quality ratings may be normalized and linearized. Accordingly, each metric may be normalized to have values from 0.0-1.0 where 0.0 is perfect and 1.0 is the limit as previously described. By transforming each quality metric to the 0.0-1.0 scale for the metric, the quality ratings for various metrics may be accurately compared.

To calculate the measured value of each metric to the described scale, a normalization value and a delta value may be calculated for each metric. An exemplary equation for calculating the normalization and delta values is shown in Equations 1-2:

$$\text{delta} = \frac{\text{Measurement} - \text{Limit}}{\text{Normalization\_Value}}, \text{where} \quad \text{EQ. 1}$$

$$\text{Normalization\_Value} = \text{Limit} - \text{Perfect\_Value} \quad \text{EQ. 2}$$

For example, for an exemplary metric M, consider if a perfect value for M is 0.0 and if a larger value is worse for M such that the predetermined limit is 5.0. Where the normalization value is the difference between the perfect value and the predetermined limit, the normalization value is 5.0−0.0=5.0. The delta for metric M may then be calculated as the difference between the measurement and the predetermined limit and divided by the corresponding normalization value as shown in Equation 3:

$$\text{delta}_M = \frac{\text{Measurement}_M - 5.0}{5.0} \quad \text{EQ. 3}$$

For example, if a frame has measured M value of 6.5, then the $\text{delta}_M$ for the frame is shown in Equation 4:

$$\text{delta}_M = \frac{6.5 - 5.0}{5.0} = \frac{1.5}{5.0} = 0.3 \quad \text{EQ. 4}$$

Then consider exemplary metric S, if a perfect value for S is 1.0 and if a larger value is better for S such that the predetermined limit is 0.980, the normalization value is 0.980−1.0=−0.020. The delta for metric S may then be calculated as the difference between the measurement and the predetermined limit and divided by the corresponding normalization value as shown in Equation 5:

$$\text{delta}_S = \frac{\text{Measurement}_S - 0.980}{-0.020} \quad \text{EQ. 5}$$

For example, if a frame has measured S value of 0.974, then the delta$_S$ for the frame is shown in Equation 6:

$$\text{delta}_M = \frac{0.974 - 0.980}{-0.020} = \frac{-0.006}{-0.020} = 0.3 \qquad \text{EQ. 6}$$

Then a comparison of the two frames would consider them as having an equivalent quality rating.

According to an aspect of an exemplary embodiment, a row-column metric may be defined as an alternate metric for evaluating the quality of a frame. The row-column metric may be spatially localized, thereby identifying closely spaced errors rather than analyzing the quality of an entire frame. The row-column metric may be particularly advantageous for identifying bad lines or streaks that are typically at or near the edge of a frame by calculating the row-averages and column-averages of each frame. A row-column measurement may be calculated as the maximum absolute difference of corresponding averages between a source frame and a reconstructed frame.

According to an aspect of an exemplary embodiment, the row-column metric may be used to evaluate a subset of rows of the frame or a subset of columns of the frame. For example, for multiple rows or for multiple columns in a frame, the quality analysis tool may calculate the maximum row metric for a frame and the maximum column metric for a frame. A row metric for row i is illustrated in Equation 7 and a column metric for column j is illustrated in Equations 8. An exemplary calculation for combining the separate row and column metrics is illustrated in Equation 9:

$$\text{Row\_Metric} = \max_i(\text{Row\_Metric}_i) \qquad \text{EQ. 7}$$

$$\text{Column\_Metric} = \max_j(\text{Column\_Metric}_j) \qquad \text{EQ. 8}$$

$$\text{Row\_Column\_Metric} = \max(\text{Row\_Metric}, \text{Column\_Metric}) \qquad \text{EQ. 9}$$

Then to calculate the row and column metrics for a frame, for each row and each column in the frame, the quality analysis tool may calculate the absolute value of the sum of the pixels in a row ($R_S$) or column ($C_S$) of the source frame subtracted from the sum of the pixels in that row ($R_R$) or column ($C_R$) of the reconstructed frame divided by the number of pixels in the row or column (i.e. the frame width (W) or height (H) as applicable). Row and column metric calculations for row i and column j are illustrated in Equations 10-11:

$$\text{Row\_Metric}_i = \left| \frac{R_{iR} - R_{iS}}{W} \right| \qquad \text{EQ. 10}$$

$$\text{Column\_Metric}_j = \left| \frac{C_{jR} - C_{jS}}{H} \right| \qquad \text{EQ. 11}$$

Then, if the row-column measurement for any row or column is greater than a predetermined threshold, it may be determined that the reconstructed frame fails the quality analysis. The row-column metric may additionally compare alternating rows, for example the averages of the even-numbered rows to identify errors in interlaced video.

The row-column metric may be configured to adapt to overall frame brightness changes without identifying such changes as quality errors. To adjust the analysis for overall brightness changes, a frame brightness offset may be applied to each row or column measurement for the frame, thereby the rows or columns with a row-column measurement that differs by the brightness offset are consistent and should not be considered bad rows. For example, for each reconstructed frame, the quality analysis tool may calculate a brightness offset by adding up all the pixels (N) of the frame, subtracting the total value of the pixels in the source frame ($F_S$) from the total value of the reconstructed frame ($F_R$), and dividing by the number of pixels (N) as shown in Equation 12:

$$\text{Brightness\_Offset} = \frac{F_R - F_S}{N} \qquad \text{EQ. 12}$$

The calculated brightness offset alone may be considered another quality analysis metric and may be averaged, subject to limits and normalization, and other operations as described herein.

Then to accommodate for the calculated brightness offset, the row-column metric calculations may be adjusted as shown in Equations 13-14:

$$\text{Row\_Metric}_i = \left| \frac{R_{iR} - R_{iS}}{W} - \text{Brightness\_Offset} \right| \qquad \text{EQ. 13}$$

$$\text{Column\_Metric}_j = \left| \frac{C_{jR} - C_{jS}}{H} - \text{Brightness\_Offset} \right| \qquad \text{EQ. 14}$$

In an aspect of an exemplary embodiment, this type of calculation need not be limited to rows and columns but may be applicable to other regions of a frame. For example, a patch metric may be considered that compares the averages of the pixels in a patch including a pixel block or similar bounded region. Then a patch metric may identify errors in a single macroblock that were introduced as a result of macroblock-based coding modes or other conventional codec computations.

According to an aspect of an exemplary embodiment, the row-metric calculation may be based on a squared difference or other two-parameter function rather than the absolute value as a measure for each row, column, or patch.

As discussed above, FIGS. 2 and 3 illustrate functional block diagrams of encoders. In implementation, the encoders may be embodied as hardware systems, in which case, the blocks illustrated in FIGS. 2 and 3 may correspond to circuit sub-systems within encoder systems. Alternatively, the encoders may be embodied as software systems, in which case, the blocks illustrated may correspond to program modules within encoder software programs. In yet another embodiment, the encoders may be hybrid systems involving both hardware circuit systems and software programs. For example, the coding engine 207 may be provided as an integrated circuit while the pre-processor 205 may be provided as software modules. Other implementations also may be used. Moreover, not all of the functional blocks described herein need be provided or need be provided as separate units. For example, although FIG. 2 illustrates the components of an exemplary encoder, such as the pre-processor 205 and coding engine 210, as separate units, in one or more embodiments, some or all of them may be integrated. Such implementation details are immaterial to the operation of the present invention unless otherwise noted above.

In some applications, the modules described hereinabove may be provided as elements of an integrated software system, in which the blocks may be provided as separate elements of a computer program. Some embodiments may be implemented, for example, using a non-transitory computer-readable storage medium or article which may store an instruction or a set of instructions that, if executed by a processor, may cause the processor to perform a method in accordance with the disclosed embodiments. Other applications of the present invention may be embodied as a hybrid system of dedicated hardware and software components.

The exemplary methods and computer program instructions may be embodied on a non-transitory machine readable storage medium. In addition, a server or database server may include machine readable media configured to store machine executable program instructions. The features of the embodiments of the present invention may be implemented in hardware, software, firmware, or a combination thereof and utilized in systems, subsystems, components or subcomponents thereof. The "machine readable storage media" may include any medium that can store information. Examples of a machine readable storage medium include electronic circuits, semiconductor memory device, ROM, flash memory, erasable ROM (EROM), floppy diskette, CD-ROM, optical disk, hard disk, fiber optic medium, or any electromagnetic or optical storage device.

While the invention has been described in detail above with reference to some embodiments, variations within the scope and spirit of the invention will be apparent to those of ordinary skill in the art. Thus, the invention should be considered as limited only by the scope of the appended claims.

We claim:

1. A method for evaluating video data, comprising:
   identifying a plurality of errors in a reconstructed video data;
   comparing a first portion of the reconstructed video data to a first quality threshold, the first portion having an identified error;
   if a quality value for the first portion is below the first quality threshold, identifying the first portion as failing the evaluation;
   pooling the identified errors;
   comparing a second portion of reconstructed video data to a second quality threshold, the second portion having a pool of identified errors; and
   if a quality value for the second portion is below the second quality threshold, identifying the second portion as failing the evaluation;
   wherein the second portion of reconstructed video data is larger than the first portion of reconstructed video data and the first quality threshold is smaller than the second quality threshold.

2. The method of claim 1, further comprising:
   interpolating a third quality threshold between the first and second quality thresholds; and
   comparing a third portion of reconstructed video data to the third quality threshold, the third portion being a subset of the second portion and larger than the first portion.

3. The method of claim 1, further comprising:
   comparing the reconstructed video data to a source video data.

4. The method of claim 1, wherein the quality value for the first portion is calculated using an analysis metric.

5. The method of claim 4, wherein the analysis metric is associated with a predetermined threshold and the first quality threshold equals the predetermined threshold.

6. The method of claim 4, further comprising normalizing the quality value.

7. The method of claim 4, further comprising setting a limit for the quality value.

8. The method of claim 4, wherein the analysis metric is selected from a group consisting of a just noticeable difference metric, a mean-squared error metric, a peak signal-to-noise ratio metric, a row-column metric, a structural similarity metric, a pixel-difference metric, a squared pixel difference metric, an absolute pixel difference metric, a local pixel covariance metric, and a block-wise pixel covariance metric.

9. The method of claim 1, wherein the reconstructed video data is a frame, the first portion is a pixel and the second portion is a pixel block.

10. The method of claim 9, further comprising:
    interpolating a third quality threshold between the first and second quality thresholds; and
    comparing a third portion of reconstructed video data to the third quality threshold, the third portion being a subset of the second portion and larger than the first portion.

11. The method of claim 9, wherein the quality value of the second portion is determined with a row-column analysis.

12. The method of claim 11, wherein the row-column analysis further comprises:
    for each of a plurality of rows in the second portion, calculating an absolute value of a difference between a summation of pixels in the row and a summation of pixels in the corresponding row of a source portion, divided by a total number of pixels in the row;
    determining a quality value as the maximum of all the quotients calculated for the plurality of rows.

13. The method of claim 11, wherein the row-column analysis further comprises:
    for each of a plurality of columns in the second portion, calculating an absolute value of a difference between a summation of pixels in the column and a summation of pixels in the corresponding column of a source portion, divided by a total number of pixels in the column; and
    determining a quality value as the maximum of all the quotients calculated for the plurality of columns.

14. The method of claim 11, wherein the row-column analysis further comprises:
    for each of a plurality of rows in the second portion, calculating an absolute value of a difference between a summation of pixels in the row and a summation of pixels in the corresponding row of a source portion, divided by a total number of pixels in the row;
    for each of a plurality of columns in the second portion, calculating an absolute value of a difference between a summation of pixels in the column and a summation of pixels in the corresponding column of a source portion, divided by a total number of pixels in the column; and
    determining a quality value as the maximum of all the quotients calculated for the plurality of rows and for the plurality of columns.

15. The method of claim 11, wherein the row-column analysis further comprises:
    for a row in the second portion, calculating an absolute value of a difference between a summation of pixels in the row and a summation of pixels in the corresponding row of a source portion, divided by a total number of pixels in the row;
    for a column in the second portion, calculating an absolute value of a difference between a summation of pixels in the column and a summation of pixels in the corresponding column of a source portion, divided by a total number of pixels in the column; and
    determining a quality value as the quotient calculated for the row and for the column.

16. The method of claim 11, further comprising:
    adjusting the row-column analysis to accommodate global changes in brightness.

17. The method of claim 1, wherein the reconstructed video data is a plurality of frames, the first portion is a frame and the second portion is a sequence of frames within the plurality of frames.

18. The method of claim 17, wherein the quality value for the first portion is calculated using an analysis metric.

19. The method of claim 18, wherein the analysis metric is selected from a group consisting of a just noticeable difference metric, a mean-squared error metric, a peak signal-to-noise ratio metric, a row-column metric, a structural similarity metric, a pixel-difference metric, a squared pixel difference metric, an absolute pixel difference metric, a local pixel covariance metric, and a block-wise pixel covariance metric.

20. The method of claim 17, wherein the quality value of the first portion is determined with a row-column analysis of the frame.

21. The method of claim 20, further comprising:
adjusting the row-column analysis to accommodate global changes in brightness.

22. The method of claim 20, wherein the row-column analysis further comprises:
for each of a plurality of rows in the frame, calculating an absolute value of a difference between a summation of pixels in the row and a summation of pixels in the corresponding row of a source frame, divided by a total number of pixels in the row;
determining a quality value as the maximum of all the quotients calculated for the plurality of rows.

23. The method of claim 20, wherein the row-column analysis further comprises:
for each of a plurality of columns in the frame, calculating an absolute value of a difference between a summation of pixels in the column and a summation of pixels in the corresponding column of a source frame, divided by a total number of pixels in the column; and
determining a quality value as the maximum of all the quotients calculated for the plurality of columns.

24. The method of claim 20, wherein the row-column analysis further comprises:
for each of a plurality of rows in the frame, calculating an absolute value of a difference between a summation of pixels in the row and a summation of pixels in the corresponding row of a source frame, divided by a total number of pixels in the row;
for each of a plurality of columns in the frame, calculating an absolute value of a difference between a summation of pixels in the column and a summation of pixels in the corresponding column of a source frame, divided by a total number of pixels in the column; and
determining a quality value as the maximum of all the quotients calculated for the plurality of rows and for the plurality of columns.

25. The method of claim 17, wherein the quality value of the second portion is determined with a row-column analysis of the frames in the sequence of frames.

26. The method of claim 17, wherein the sequence of frames comprises a fixed number of consecutive frames.

27. The method of claim 17, further comprising:
interpolating a third quality threshold between the first and second quality thresholds; and
comparing a third portion of reconstructed video data to the third quality threshold, the third portion being a subset of the second portion and larger than the first portion.

28. The method of claim 17, further comprising:
comparing a reconstructed frame to a source frame.

29. The method of claim 17, further comprising normalizing a quality value.

30. The method of claim 17, further comprising setting a limit for a quality value.

31. A method for evaluating video data, comprising:
identifying a plurality of pixel errors in a reconstructed frame;
for each identified pixel error:
comparing the quality of the pixel to a first threshold;
if the quality of the pixel is below the first threshold, identifying the frame as failing the evaluation;
for each of a plurality of pixel blocks in the frame:
comparing the quality of the pixel block to a second threshold; and
if the pixel block quality is below the second threshold, identifying the frame as failing the evaluation;
wherein the first threshold is smaller than the second threshold.

32. The method of claim 31, further comprising:
for each of a plurality of sub-blocks of pixels in the frame:
comparing the quality of the sub-block to a third threshold; and
if the sub-block quality is below the third threshold, identifying the frame as failing the evaluation;
wherein the third threshold is interpolated from the first threshold and the second threshold.

33. A method for evaluating video data, comprising:
evaluating the quality of a plurality of frames in the video data;
for each of the plurality of frames:
comparing the quality of the frame to a first threshold;
if the quality of the frame is below the first threshold, identifying the frame as failing the evaluation;
for each of a plurality of sequences of frames in the video data:
comparing the quality of the sequence of frames to a second threshold; and
if the sequence quality is below the second threshold, identifying the sequence of frames as failing the evaluation;
wherein the first quality threshold is smaller than the second quality threshold.

34. The method of claim 33, further comprising:
for each of a plurality of sub-sequences of frames in a sequence of frames:
comparing the quality of the sub-sequence to a third threshold; and
if the sub-sequence quality is below the third threshold, identifying the sub-sequence as failing the evaluation;
wherein the third threshold is interpolated from the first threshold and the second threshold.

35. A system comprising:
an encoder to code source video data;
a decoder to decode the encoded video data;
a controller to analyze the decoded video data by:
identifying a plurality of errors in the decoded video data;
comparing a first portion of the decoded video data to a first quality threshold, the first portion having an identified error;
if a quality value for the first portion is below the first quality threshold, identifying the first portion as failing the evaluation;
pooling the identified errors;
comparing a second portion of the decoded video data to a second quality threshold, the second portion having a pool of identified errors; and if a quality value for the second portion is below the second quality threshold, identifying the second portion as failing the evaluation;

wherein the second portion of reconstructed video data is larger than the first portion of reconstructed video data and the first quality threshold is smaller than the second quality threshold.

36. The system of claim 35, further comprising a display to display the identified portions for review.

37. A non-transitory computer readable medium storing program instructions that, when executed by a processing device, cause the device to:

identify a plurality of errors in a reconstructed video data;

compare a first portion of the reconstructed video data to a first quality threshold, the first portion having an identified error;

if a quality value for the first portion is below the first quality threshold, identify the first portion as failing the evaluation;

pool the identified errors;

compare a second portion of reconstructed video data to a second quality threshold, the second portion having a pool of identified errors; and if a quality value for the second portion is below the second quality threshold, identify the second portion as failing the evaluation;

wherein the second portion of reconstructed video data is larger than the first portion of reconstructed video data and the first quality threshold is smaller than the second quality threshold.

* * * * *